R. E. COLE.
BATTERY HOLDER.
APPLICATION FILED MAY 20, 1916.
1,218,056.
Patented Mar. 6, 1917.
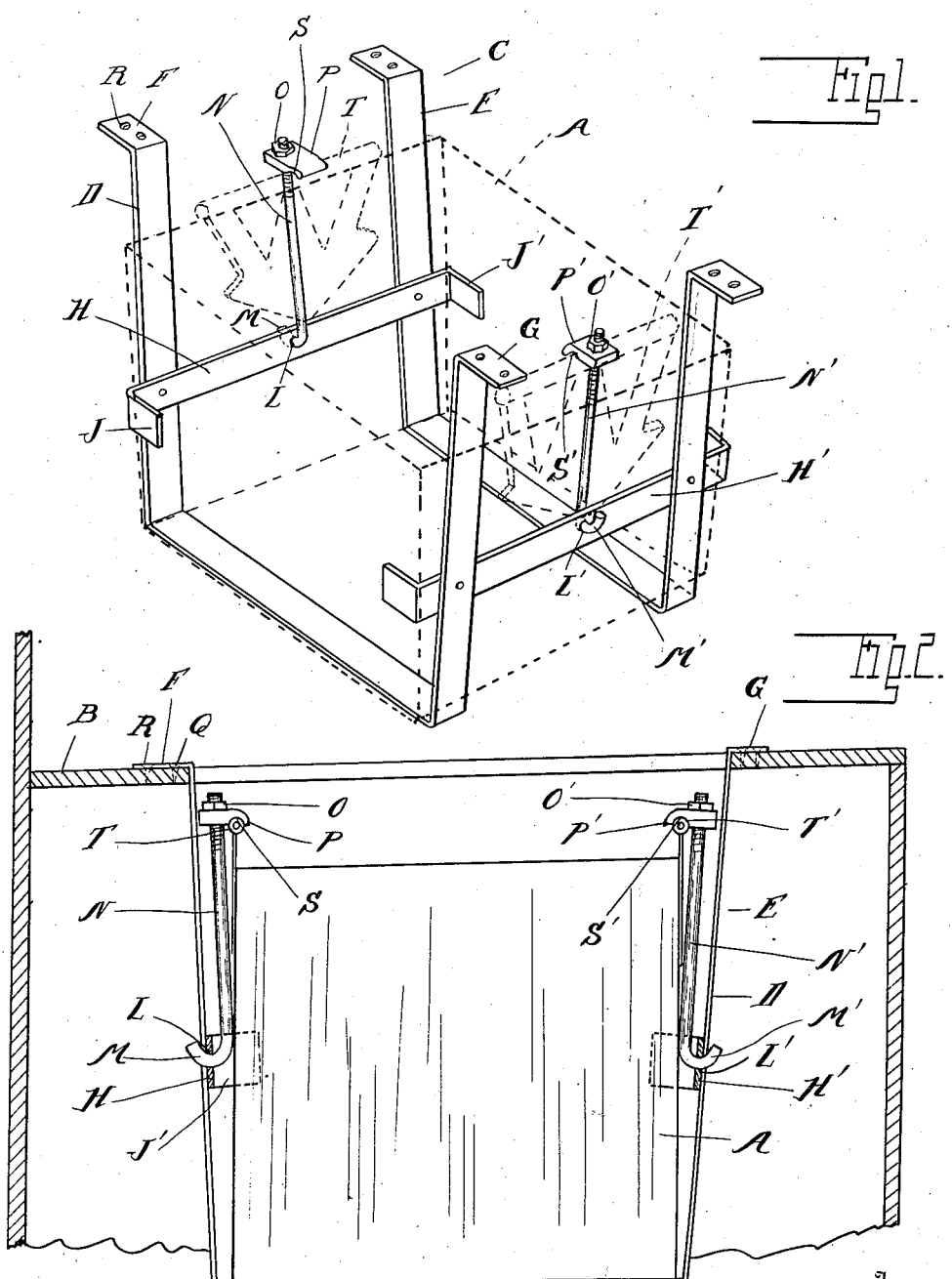
Inventor
Roy E. Cole
By Whittemore Hulbert & Whittemore
Attorneys

UNITED STATES PATENT OFFICE.

ROY E. COLE, OF DETROIT, MICHIGAN, ASSIGNOR TO LIBERTY MOTOR CAR COMPANY, OF DETROIT, MICHIGAN, A CORPORATION OF MICHIGAN.

BATTERY-HOLDER.

1,218,056.      Specification of Letters Patent.      Patented Mar. 6, 1917.

Application filed May 20, 1916. Serial No. 98,859.

*To all whom it may concern:*

Be it known that I, ROY E. COLE, a citizen of the United States of America, residing at Detroit, in the county of Wayne and State of Michigan, have invented certain new and useful Improvements in Battery-Holders, of which the following is a specification, reference being had therein to the accompanying drawings.

This invention relates to battery holders and refers more particularly to an improved and simplified construction of holder adapted for removably holding the batteries used in connection with motor vehicles or the like.

The object of the invention is to provide a construction which can be economically manufactured and readily applied to motor vehicles so as to suspend the battery in place, such as beneath the seat; to provide means for rigidly holding the battery in position in the frame, there being preferably spaced clips employed for this purpose, and means for clamping these clips against the handles of the battery.

The invention further resides in such details of construction and combinations of parts as will more fully hereinafter appear.

In the drawings:

Figure 1 is a perspective view showing the battery clamped in position in the frame; and Fig. 2 is a fragmentary vertical section showing the battery frame suspended beneath the automobile seat.

Describing in detail the particular embodiment of my invention shown in the drawings, A designates a storage battery, B the automobile seat and C the battery holder. The latter comprises a pair of U-shaped strap irons D and E, the opposite ends of which have offset supporting flanges F and G. Extending transversely of the members D and E is a pair of cross-bars H and H', which are bolted to the upright portions of the members D and E. Each of these cross-bars have their ends bent at substantially right angles to provide retaining flanges J and J', and near their center are apertured, as indicated at L and L', to receive the returnbent ends M and M' of a pair of eye-bolts N and N'. The upper ends of these eye-bolts are threaded to receive clamping nuts O and O', beneath which there is sleeved on the eye-bolts the securing members P and P'.

In attaching the battery-supporting frame to the vehicle, the seat B is preferably cut away to receive the supporting frame, the size of the opening being such that the offset flanges F and G will rest upon the surrounding portions of the seat, and may be secured thereto by screws Q or other suitable securing members extending through apertures R in the flanges. The battery is positioned in the frame by lowering it between the side flanges J and J', which hold it from sidewise movement in one direction, while endwise movement is prevented by the upright portions of the U-shaped members D and E. As the battery rests upon the horizontal portion of the U-shaped members it is only necessary to lock it from upward movement in order to hold the battery rigidly in position. For locking the battery in place I preferably employ the members P and P', which have curved seats S and S' extending over the upper ends of the handles T and T' of the battery. After the latter is in position in the frame the securing members P and P' are sleeved on eye-bolts, N and N', and the nuts O and O' tightened up to firmly clamp the securing members against the handles of the battery.

In removing the battery for repair or renewal, it is only necessary to loosen the locking nuts and adjust the securing members out of the path of movement of the battery. The latter can then be lifted out of place in the usual manner. Thus the battery holder is one which is not only simplified in construction but convenient in use. The invention, however, is not limited to the details of construction except as specified in the appended claims.

What I claim as my invention is:—

1. A battery holder, comprising a pair of spaced U-shaped strap members, and transversely-positioned strap members having offset flanges at their ends.

2. A battery holder, comprising spaced U-shaped strap members having outwardlyextending offset flanges at their upper ends, and cross-bars connecting said strap members and having inwardly-bent flanges.

3. A battery holder, comprising a pair of supporting members having end uprights and connecting horizontal portions of a pair of strap members secured to the end uprights intermediate the ends thereof, said strap members having their ends bent at substantially right angles to form retaining flanges, and adjustable means engageable with the handle of the battery for locking same in position in said holder.

In testimony whereof I affix my signature.

ROY E. COLE.